United States Patent
Sakai et al.

(10) Patent No.: US 11,486,492 B2
(45) Date of Patent: Nov. 1, 2022

(54) SHIFT DEVICE

(71) Applicant: AISIN CORPORATION, Kariya (JP)

(72) Inventors: Kosuke Sakai, Kariya (JP); Takashi Mizuno, Kariya (JP)

(73) Assignee: AISIN CORPORATION, Aichi (JP)

( * ) Notice: Subject to any disclaimer, the term of this patent is extended or adjusted under 35 U.S.C. 154(b) by 36 days.

(21) Appl. No.: 17/207,933

(22) Filed: Mar. 22, 2021

(65) Prior Publication Data
US 2021/0388899 A1  Dec. 16, 2021

(30) Foreign Application Priority Data
Jun. 16, 2020 (JP) .............................. JP2020-103884

(51) Int. Cl.
*F16H 61/32* (2006.01)
*F16H 61/28* (2006.01)

(52) U.S. Cl.
CPC ......... *F16H 61/32* (2013.01); *F16H 61/2807* (2013.01); *F16H 2061/2892* (2013.01); *F16H 2061/326* (2013.01)

(58) Field of Classification Search
CPC ................. F16H 61/32; F16H 61/2807; F16H 2061/2892; F16H 2061/326
See application file for complete search history.

(56) References Cited

U.S. PATENT DOCUMENTS

| | | |
|---|---|---|
| 8,816,551 B2 | 8/2014 | Oishi |
| 9,951,866 B2 | 4/2018 | Kuwahara et al. |
| 2009/0078489 A1* | 3/2009 | Feier .................. H02K 7/06 180/339 |
| 2015/0285373 A1* | 10/2015 | Nagahori ............ F16H 61/0006 475/149 |
| 2017/0152942 A1* | 6/2017 | Makino ................. H02K 1/146 |

(Continued)

FOREIGN PATENT DOCUMENTS

| | | |
|---|---|---|
| JP | 5556833 B2 | 7/2014 |
| JP | 5932095 B1 | 6/2016 |

(Continued)

OTHER PUBLICATIONS

U.S. Appl. No. 17/207,887, filed Mar. 22, 2021, Kosuke Sakai et al.

*Primary Examiner* — Edwin A Young
(74) *Attorney, Agent, or Firm* — Buchanan Ingersoll & Rooney PC

(57) ABSTRACT

A shift device includes: a shift switching member that includes a plurality of valley portions corresponding to a shift position; and an actuator that drives the shift switching member. The actuator includes a motor, a driving force transmission mechanism that transmits a driving force of the motor to an output shaft, a control board that includes a rotation angle sensor detecting a rotation angle of the motor and controls the motor based on a detection result obtained by the rotation angle sensor, a housing and an outer lid that form a housing space housing the motor and the control board, the outer lid covering an opening of the housing, and an inner lid that is housed in the housing space and to which the motor is attached, and the housing includes a first positioning portion that positions both the inner lid and the control board with respect to the housing.

7 Claims, 6 Drawing Sheets

(56) References Cited

U.S. PATENT DOCUMENTS

| | | |
|---|---|---|
| 2019/0207472 A1 | 7/2019 | Uematsu et al. |
| 2020/0099270 A1* | 3/2020 | Kato ...................... H02K 3/522 |
| 2021/0215237 A1* | 7/2021 | Wei ......................... F16H 63/00 |

FOREIGN PATENT DOCUMENTS

| | | |
|---|---|---|
| JP | 6455059 B2 | 1/2019 |
| JP | 2019122082 A | 7/2019 |

* cited by examiner

SHIFT DEVICE

CROSS REFERENCE TO RELATED APPLICATIONS

This application is based on and claims priority under 35 U.S.C. § 119 to Japanese Patent Application No. 2020-103884, filed on Jun. 16, 2020, the entire content of which is incorporated herein by reference.

TECHNICAL FIELD

This disclosure generally relates to a shift device, and particularly to a shift device including a shift switching member including a plurality of valley portions corresponding to a shift position.

BACKGROUND DISCUSSION

In the related art, a shift device including a shift switching member including a plurality of valley portions corresponding to a shift position is known (see, for example, Japanese Patent No. 5932095).

Japanese Patent No. 5932095 discloses a range switching mechanism (shift device) including a detent plate (shift switching member) including a plurality of valley portions corresponding to a shift position. The range switching mechanism includes a range switching device that revolves the detent plate. The range switching mechanism includes a motor and a control board that controls the motor. A motor position detection sensor for detecting a rotation position of the motor is attached to the control board.

The range switching mechanism of Japanese Patent No. 5932095 includes a bearing fixing portion that rotatably supports the motor, a rear body to which the control board is fixed, and a front body that forms a housing together with the rear body. The rear body includes a cylindrical protrusion that positions the control board. The motor is positioned by being fixed to the bearing fixing portion.

However, in the range switching mechanism of Japanese Patent No. 5932095, the motor and the control board on which the motor position detection sensor is mounted are positioned by the bearing fixing portion and the rear body, respectively. Accordingly, in the range switching mechanism of Japanese Patent No. 5932095, since a position which is a positioning reference is different, there is a disadvantage that it is difficult to improve accuracy of a relative positional relationship between the motor and the motor position detection sensor on the control board. Therefore, in the range switching mechanism of Japanese Patent No. 5932095, since it is difficult to improve accuracy of a rotation angle position of the motor, which is detected by the motor position detection sensor (rotation angle sensor), there is a problem that it is difficult to improve accuracy with which the rotation angle position of the motor is controlled by the control board.

A need thus exists for a shift device which is not susceptible to the drawback mentioned above.

SUMMARY

A shift device according to an aspect of the present disclosure, includes: a shift switching member that includes a plurality of valley portions corresponding to a shift position; and an actuator that drives the shift switching member, in which the actuator includes a motor, a driving force transmission mechanism that transmits a driving force of the motor to an output shaft, a control board that includes a rotation angle sensor detecting a rotation angle of the motor and controls the motor based on a detection result obtained by the rotation angle sensor, a housing and an outer lid that form a housing space housing the motor and the control board, the outer lid covering an opening of the housing, and an inner lid that is housed in the housing space and to which the motor is attached, and the housing includes a first positioning portion that positions both the inner lid and the control board with respect to the housing.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments of the disclosure will be described with reference to the drawings.

A configuration of a shift device 100 mounted on a vehicle such as an electric vehicle will be described with reference to FIGS. 1 to 8.

Figure 1:
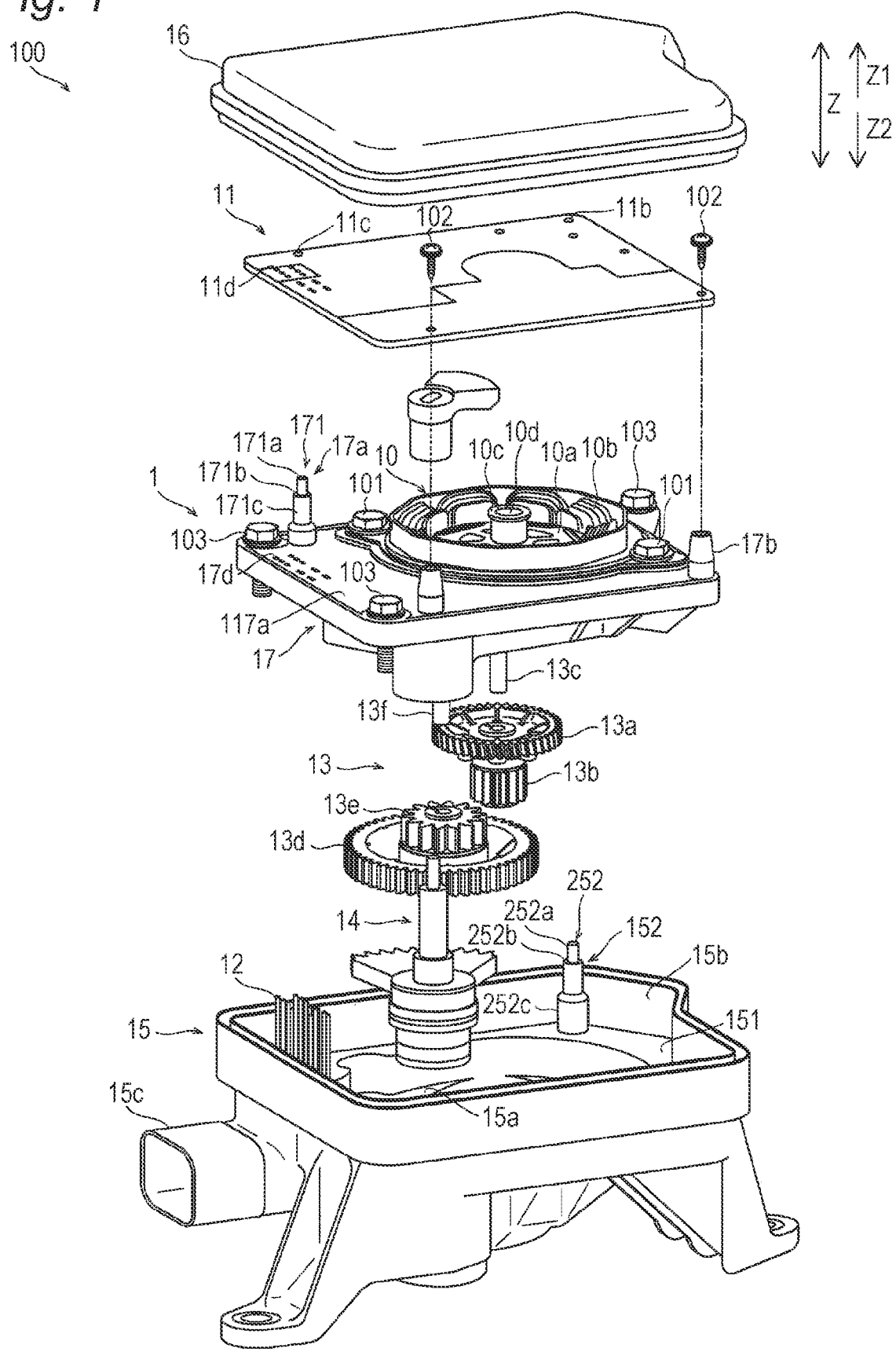
FIG. 1 is an exploded perspective view of a shift device according to an embodiment.
Figure 2:
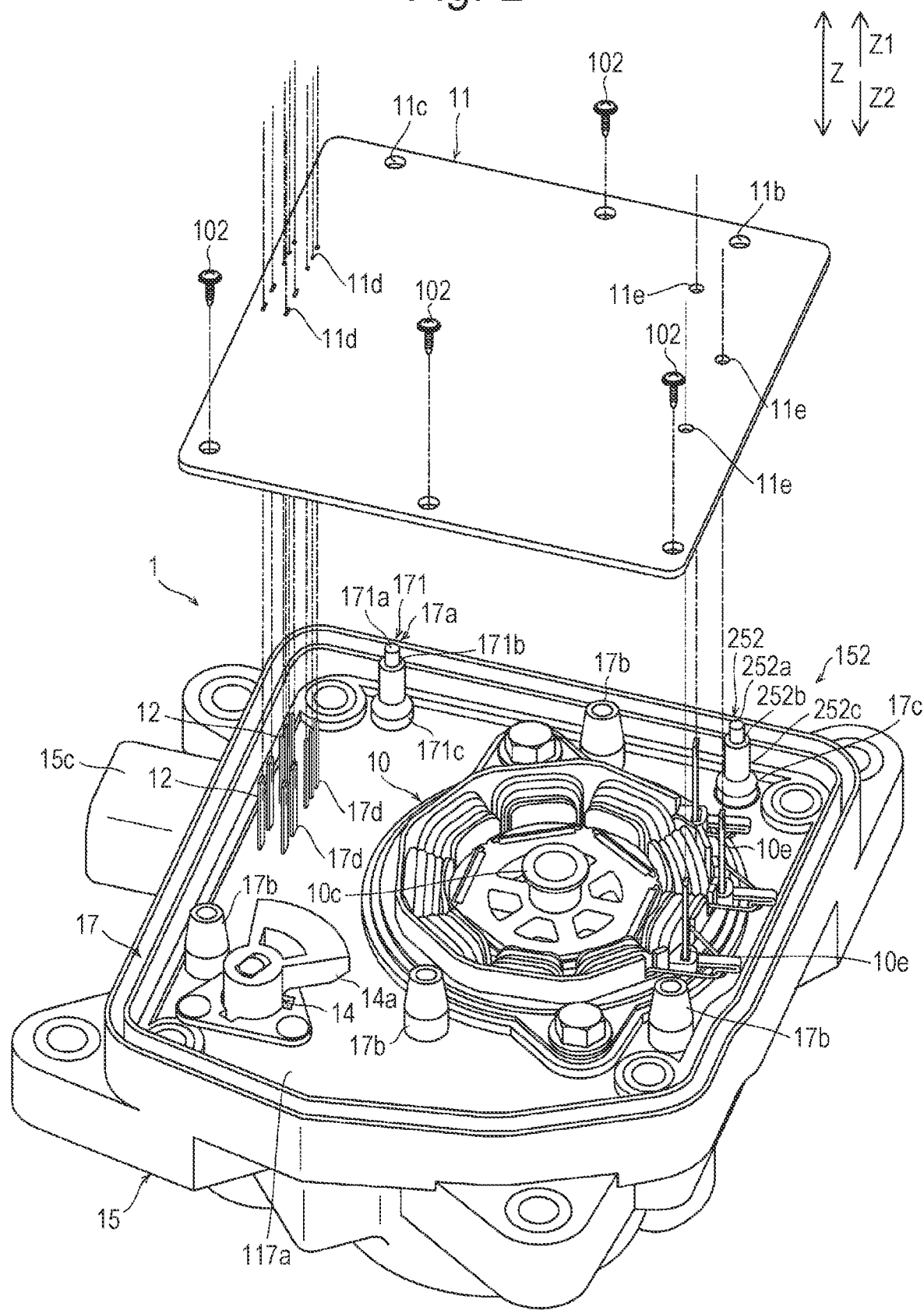
FIG. 2 is an exploded perspective view of a state in which an outer lid of a shift device according to the embodiment is removed.

As illustrated in FIGS. 1 and 2, in a vehicle, when an occupant (driver) performs a shift switching operation by using an operation unit such as a shift lever (or shift switch), an electric shift switching control is performed on a transmission mechanism portion. That is, a position of the shift lever is input to the shift device 100 via a shift sensor provided in the operation unit. Then, based on a control signal transmitted from a dedicated control board 11 provided in the shift device 100, the transmission mechanism portion is switched to any shift position of a P (parking) position, a R (reverse) position, an N (neutral) position and a D (drive) position, which are corresponding to the shift operation of the occupant. Such a shift switching control is referred to as shift-by-wire. Each of the P, R, N, and D positions is an example of the "shift position" in the claims.

Figure 8:
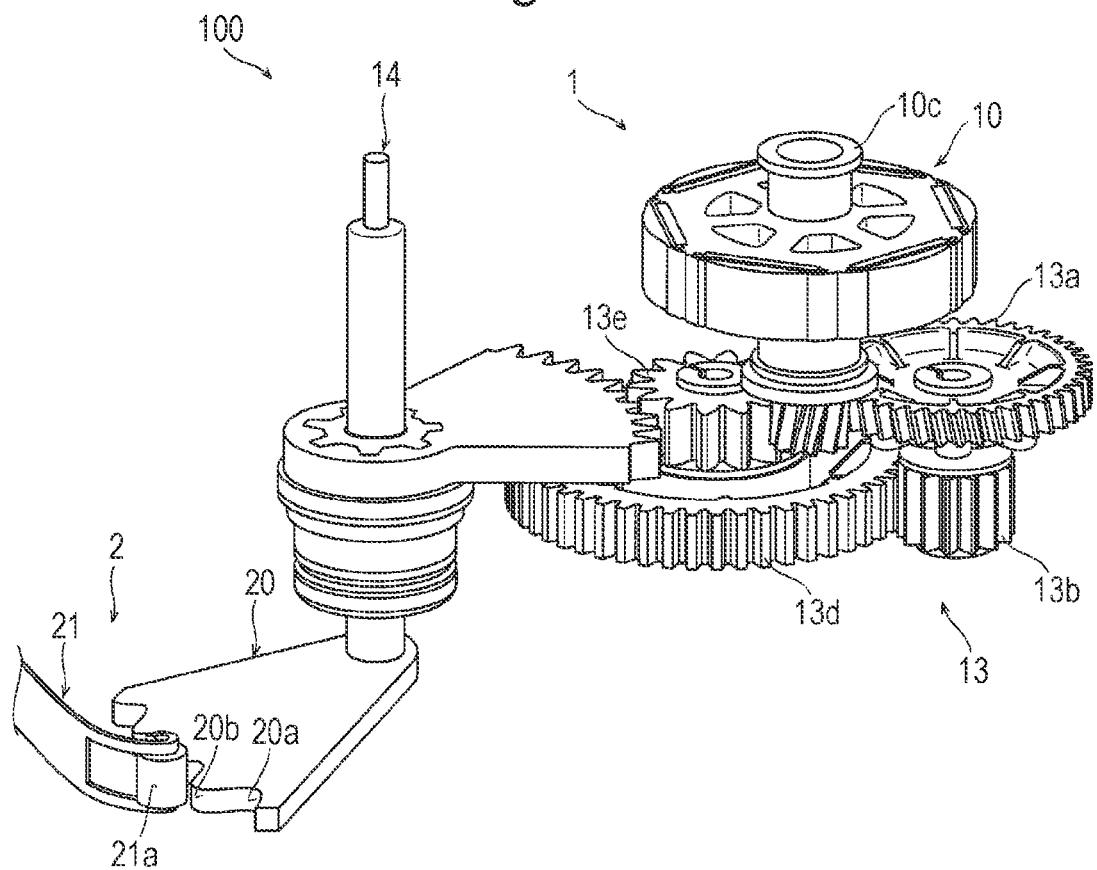
FIG. 8 is a perspective view illustrating a connection between a driving force transmission mechanism and a driving side member of a shift device according to the embodiment.

The shift device 100 includes an actuator 1 and a shift switching mechanism 2 (see FIG. 8) including a shift switching member 20 (see FIG. 8).

The actuator 1 is a driving device that drives the shift switching member 20 based on a shift switching operation of the occupant (driver). The actuator 1 includes a motor 10, a control board 11, a connection terminal 12, a driving force transmission mechanism 13, an output shaft 14 including a magnet portion 14*a*, a housing 15, an outer lid 16, and an inner lid 17.

The motor 10 is an interior permanent magnet (IPM) three-phase brushless motor. The motor 10 is fixed to the inner lid 17 by a fastening member 101.

The motor 10 includes a rotor 10*a*, a stator 10*b*, a shaft 10*c*, a magnet 10*d*, and a connection terminal 10*e*. Here, a direction in which the shaft 10*c* extends is a Z direction, the outer lid 16 side in the Z direction is a Z1 direction, and the housing 15 side in the Z direction is a Z2 direction.

In the rotor 10*a*, an N-pole magnet and an S-pole magnet, as a permanent magnet, are alternately embedded around a rotation axis C1 (see FIG. 3) of the shaft 10*c* at an equal angle interval. The stator 10*b* has a plurality of phases (U phase, V phase and W phase) of excitation coils that generate a magnetic force by applying a current. The shaft 10*c* is configured to rotate around the rotation axis C1 together with the rotor 10*a*. The shaft 10*c* is rotatably supported by the inner lid 17. The magnet 10*d* is attached to the shaft 10*c* to detect a rotation angle position of the shaft 10*c*. The magnet 10*d* is disposed in an end of the shaft 10*c* on the Z1 direction side (one side).

The connection terminal 10*e* connects the stator 10*b* of the motor 10 and the control board 11. The connection terminal 10*e* is a terminal that connects the stator 10*b* and the control board 11. The connection terminal 10*e* is made of metal. The connection terminal 10*e* electrically connects the stator 10*b* and the control board 11. That is, the connection terminal 10*e* connects the motor 10 and the control board 11, and an end of the connection terminal 10*e* on the control board 11 side is attached to the control board 11.

Figure 3:
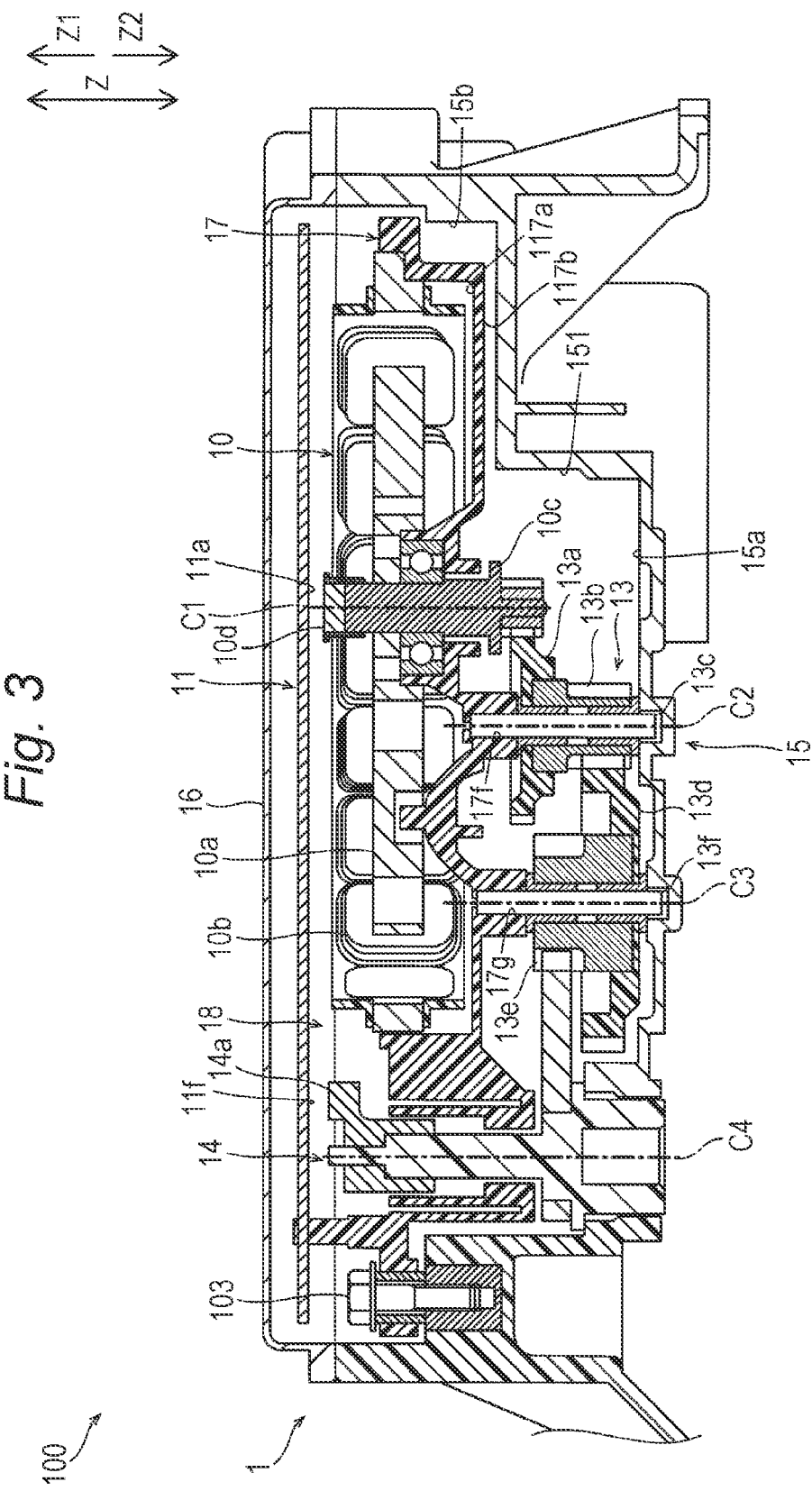
FIG. 3 is a cross-sectional view of a shift device according to the embodiment.

As illustrated in FIGS. 2 and 3, the control board 11 is configured to control the motor 10. The control board 11 is a board component in which electronic components are mounted on a board. The control board 11 is fixed to the inner lid 17 by a fastening member 102.

On the control board 11, a rotation angle sensor 11*a* is disposed in a position facing the magnet 10*d* in the Z direction (direction in which the shaft 10*c* extends). The rotation angle sensor 11*a* is configured to detect the rotation angle of the motor 10. That is, the rotation angle sensor 11*a* is a sensor that detects an amount of rotation (rotation angle) of the shaft 10*c* by the magnet 10*d* attached to the shaft 10*c*. The rotation angle sensor 11*a* is disposed in a position facing the magnet 10*d* in the Z direction. That is, the magnet 10*d* and the rotation angle sensor 11*a* are disposed on the rotation axis C1 of the shaft 10*c* with a predetermined gap.

As described above, the control board 11 is configured to control the motor 10 based on the detection result of the rotation angle sensor 11*a*.

The control board 11 includes a first board side insertion hole 11*b*, a second board side insertion hole 11*c*, a plurality of fitting holes 11*d*, and a plurality of fitting holes 11*e*. The first board side insertion hole 11*b*, the second board side insertion hole 11*c*, the plurality of fitting holes 11*d*, and the plurality of fitting holes 11*e* are through holes that penetrate the board in the Z direction. A first protrusion portion 252, which will be described later, is inserted into the first board side insertion hole 11*b*. A second protrusion portion 171, which will be described later, is inserted into the second board side insertion hole 11*c*. A tip of the connection terminal 12 on the Z1 direction side is inserted and fitted into each of the plurality of fitting holes 11*d*. A tip of the connection terminal 10*e* on the Z1 direction side is inserted and fitted into each of the plurality of fitting holes 11*e*.

On the control board 11, a rotation angle sensor 11*f* is disposed in a position facing the magnet portion 14*a* in the Z direction (direction in which the output shaft 14 extends). The rotation angle sensor 11*f* is configured to detect the rotation angle of the output shaft 14. That is, the rotation angle sensor 11*f* is a sensor that detects an amount of rotation (rotation angle) of the output shaft 14 by the magnet portion 14*a* provided to the output shaft 14. The rotation angle sensor 11*f* is disposed in a position facing the magnet portion 14*a* in the Z direction.

The connection terminal 12 connects a control device as an external device and the control board 11 via the inner lid 17. An end of the connection terminal 12 on the control board 11 side is attached to the control board 11. The connection terminal 12 is a bus bar that connects the control device and the control board 11. The connection terminal 12 is made of metal. In this way, the connection terminal 12 is electrically connected to a wiring cable to electrically connect the control device and the control board 11.

As illustrated in FIGS. 1 and 3, the driving force transmission mechanism 13 is connected to the shaft 10*c* and is configured to transmit a driving force of the motor 10 to the output shaft 14. Here, the driving force transmission mechanism 13 is configured as a reduction mechanism unit. The driving force transmission mechanism 13 includes a gear 13*a*, a gear 13*b*, a shaft portion 13*c*, a gear 13*d*, a gear 13*e*, and a shaft portion 13*f*.

The gear 13*a* and the gear 13*b* are rotated by the driving force from the motor 10. The gear 13*a* is a large-diameter gear attached to the shaft portion 13*c* on the Z1 direction side. The gear 13*a* is made of a resin. The gear 13*b* is a small-diameter gear attached to the shaft portion 13*c* on the Z2 direction side. The gear 13*b* is made of metal. The shaft portion 13*c* has a rotation axis C2 parallel to the Z direction. The shaft portion 13*c* rotatably supports the gear 13*a* and the gear 13*b*. An end of the shaft portion 13*c* on the Z1 direction side is rotatably supported by the inner lid 17. An end of the shaft portion 13*c* on the Z2 direction side is rotatably supported by the housing 15.

The gear 13*d* and the gear 13*e* are rotated by the driving force from the motor 10. The gear 13*d* is a large-diameter gear attached to the shaft portion 13*f* on the Z2 direction side. The gear 13*d* is made of a resin. The gear 13*e* is a small-diameter gear attached to the shaft portion 13*f* on the Z1 direction side. The gear 13*e* is made of metal. The shaft portion 13*f* has a rotation axis C3 parallel to the Z direction. The shaft portion 13*f* rotatably supports the gear 13*d* and the gear 13*e*. An end of the shaft portion 13*f* on the Z1 direction side is rotatably supported by the inner lid 17. An end of the shaft portion 13*f* on the Z2 direction side is rotatably supported by the housing 15.

The output shaft 14 is configured to output the driving force of the motor 10 to the shift switching member 20 (see FIG. 8). The output shaft 14 extends in the Z direction. The output shaft 14 is connected to the output side of the driving force transmission mechanism 13. The output shaft 14 is connected to the input side of the shift switching member 20. The output shaft 14 has a rotation axis C4 parallel to the Z direction. The output shaft 14 is rotatably supported by the inner lid 17 and the housing 15.

The housing 15 and the outer lid 16 form a housing space 18 that houses the motor 10, the control board 11, and the driving force transmission mechanism 13. The housing space 18 is an internal space formed of the housing 15 and the outer lid 16. Here, in the housing space 18, the control board 11 is disposed on the outer lid 16 side with respect to the inner lid 17.

Figure 4:
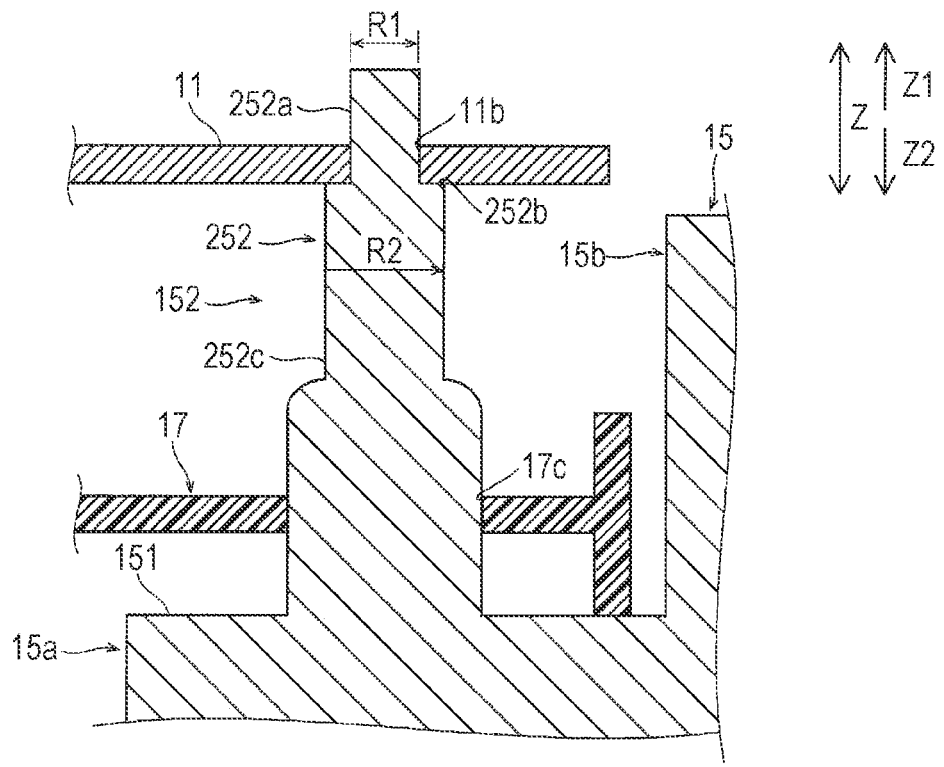
FIG. 4 is a cross-sectional view taken along a Z direction near a first positioning portion of a shift device according to the embodiment.

As illustrated in FIGS. 1 and 4, the housing 15 is disposed on the Z2 direction side. The housing 15 has a recessed shape in which a surface on the Z1 direction side is recessed in the Z2 direction. Specifically, the housing 15 includes an inner bottom surface 15a, an inner side surface 15b extending from the inner bottom surface 15a, and a socket portion 15c. The inner bottom surface 15a is a recessed bottom surface formed on the surface of the housing 15 on the Z1 direction side. The inner side surface 15b is a side surface extending in the Z1 direction from an edge of the inner bottom surface 15a.

Figure 5:
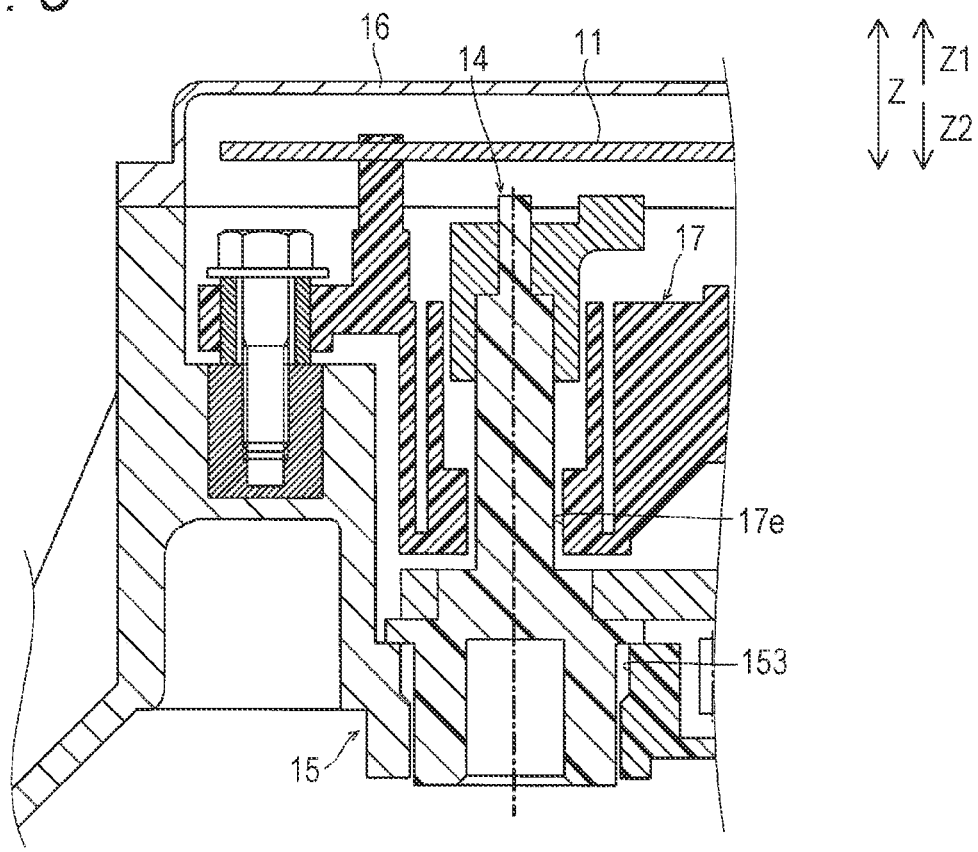
FIG. 5 is a cross-sectional view taken along a Z direction near an output shaft of a shift device according to the embodiment.

The inner side surface 15b includes a protrusion portion 151, a first positioning portion 152, and a housing side bearing hole 153 (see FIG. 5). The protrusion portion 151 protrudes from a portion of the inner side surface 15b on the Z2 direction side toward a center side of the housing 15. As described above, the protrusion portion 151 is a stepped portion.

(First Positioning Portion)

The first positioning portion 152 of the present embodiment is configured to position both the inner lid 17 and the control board 11 with respect to the housing 15. That is, the first positioning portion 152 is a common positioning portion for the inner lid 17 and the control board 11.

Here, the first positioning portion 152 positions the inner lid 17 with respect to the housing 15, whereby the driving force transmission mechanism 13 attached to the inner lid 17 via the shaft portion 13c and the shaft portion 13f is also positioned with respect to the housing 15. The first positioning portion 152 positions both the inner lid 17 and the control board 11 with respect to the housing 15, whereby the control board 11 is positioned with respect to the end of the connection terminal 12 on the control board 11 side and the end of the connection terminal 10e on the control board 11 side.

Specifically, the first positioning portion 152 includes a first protrusion portion 252 protruding from the housing 15 toward the outer lid 16. That is, the first protrusion portion 252 protrudes in the Z1 direction from a surface of the protrusion portion 151 on the Z1 direction side. The first protrusion portion 252 has a protrusion shape. Specifically, the first protrusion portion 252 has a substantially cylindrical shape. The first protrusion portion 252 of the housing 15 is inserted into an inner lid side insertion hole 17c of the inner lid 17, which will be described later, and the first board side insertion hole 11b of the control board 11, whereby the inner lid 17 and the control board 11 are positioned with respect to the housing 15.

The first protrusion portion 252 includes a small-diameter portion 252a, a first stepped portion 252b, and a large-diameter portion 252c.

The small-diameter portion 252a is provided on the outer lid 16 side and has a first diameter R1. That is, the small-diameter portion 252a is provided on a portion of the protrusion portion 151 on the Z1 direction side. The first diameter R1 is a length in a direction orthogonal to the Z direction. The small-diameter portion 252a is inserted into the first board side insertion hole 11b of the control board 11. Accordingly, the first positioning portion 152 positions the control board 11 in a direction orthogonal to the Z direction.

The first stepped portion 252b is provided at a boundary portion between the small-diameter portion 252a and the large-diameter portion 252c. The first stepped portion 252b is a mounting surface extending in a direction orthogonal to the Z direction. The control board 11 in which the small-diameter portion 252a is inserted into the first board side insertion hole 11b is mounted on the first stepped portion 252b. Accordingly, the first positioning portion 152 positions the control board 11 in the Z direction.

The large-diameter portion 252c is provided on the housing 15 side with respect to the small-diameter portion 252a, and has a second diameter R2 larger than the first diameter R1. That is, the large-diameter portion 252c is provided on a portion of the protrusion portion 151 on the Z2 direction side. The second diameter R2 is a length in a direction orthogonal to the Z direction. The large-diameter portion 252c is inserted into the inner lid side insertion hole 17c of the inner lid 17, which will be described later. Accordingly, the first positioning portion 152 positions the inner lid 17 in a direction orthogonal to the Z direction.

As illustrated in FIG. 5, the housing side bearing hole 153 is a through hole that penetrates the inner lid 17 in the Z direction. The housing side bearing hole 153 is formed in accordance with an arrangement position of the output shaft 14. The output shaft 14 is rotatably inserted into the housing side bearing hole 153.

Figure 6:
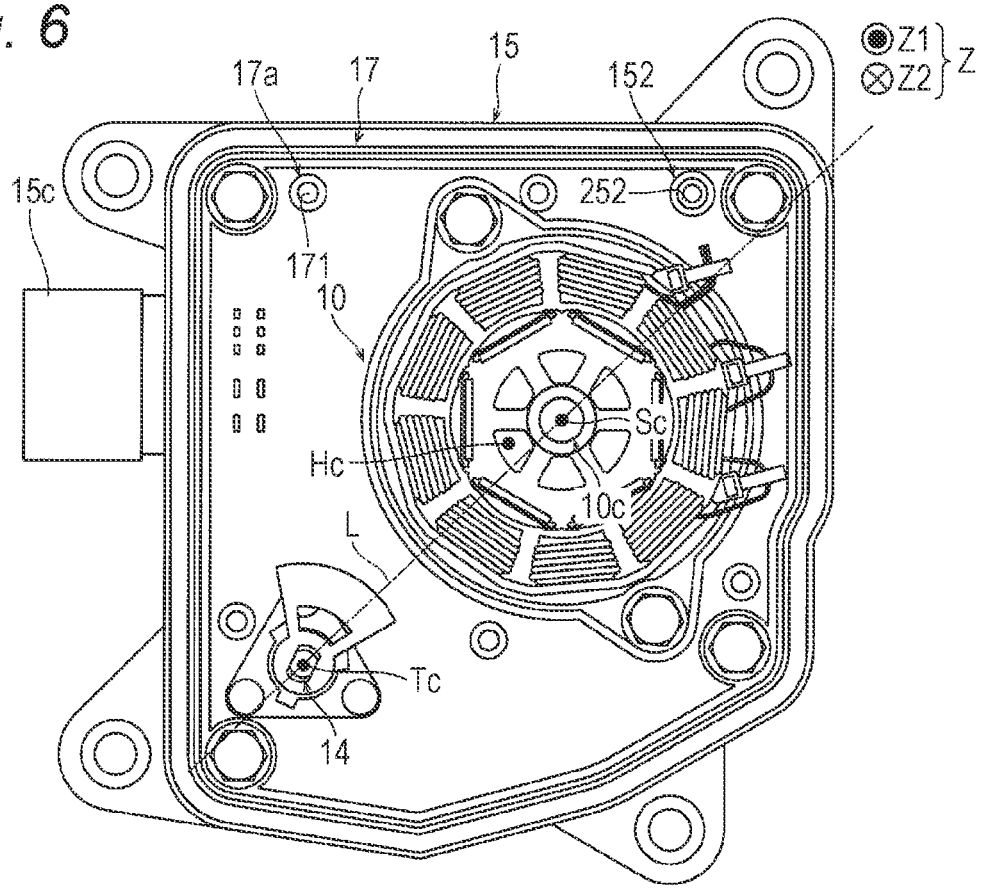
FIG. 6 is a plan view of a state in which an outer lid of a shift device according to the embodiment is removed.

As illustrated in FIG. 6, the first positioning portion 152 is disposed on the opposite side of the output shaft 14 with respect to a center position Hc of the housing 15 when seen from the Z1 direction side (axial direction side of the output shaft 14). That is, the first positioning portion 152 and the output shaft 14 are disposed in positions symmetrical with respect to the center position Hc. Specifically, the first positioning portion 152 is disposed at a corner of the inner lid 17 when seen from the Z1 direction side. The output shaft 14 is disposed at the corner of the inner lid 17 when seen from the Z1 direction side. The first positioning portion 152 and the output shaft 14 are disposed in substantially diagonal positions.

The first positioning portion 152 is disposed in a vicinity of a line L extending through a center point Tc of the output shaft 14 and a center point Sc of the shaft 10c of the motor 10 when seen from the Z1 direction side. The first positioning portion 152 is disposed in a position apart from the output shaft 14 which is located farther than the shaft 10c in a direction in which the output shaft 14 and the shaft 10c are arranged.

The socket portion 15c is configured into which a wiring cable (not shown) for mutual communication between a control device as an external device and the control board 11 can be inserted. The socket portion 15c is provided on an outer side surface of the housing 15. The socket portion 15c includes an insertion hole into which the wiring cable is inserted. The wiring cable also has a function of supplying electric power to the control board 11.

As illustrated in FIGS. 1 and 3, the outer lid 16 is disposed on the Z1 direction side. The outer lid 16 has a recessed shape in which the surface on the Z2 direction side is recessed in the Z1 direction. The outer lid 16 is a cover that covers the housing 15 from the Z1 direction side.

The inner lid 17 is a resin member extending in a direction orthogonal to the Z direction. Here, the inner lid 17 includes a second positioning portion 17a, a plurality of boss portions 17b, the inner lid side insertion hole 17c, a positioning hole 17d, and an inner lid side bearing hole 17e.

Figure 7:
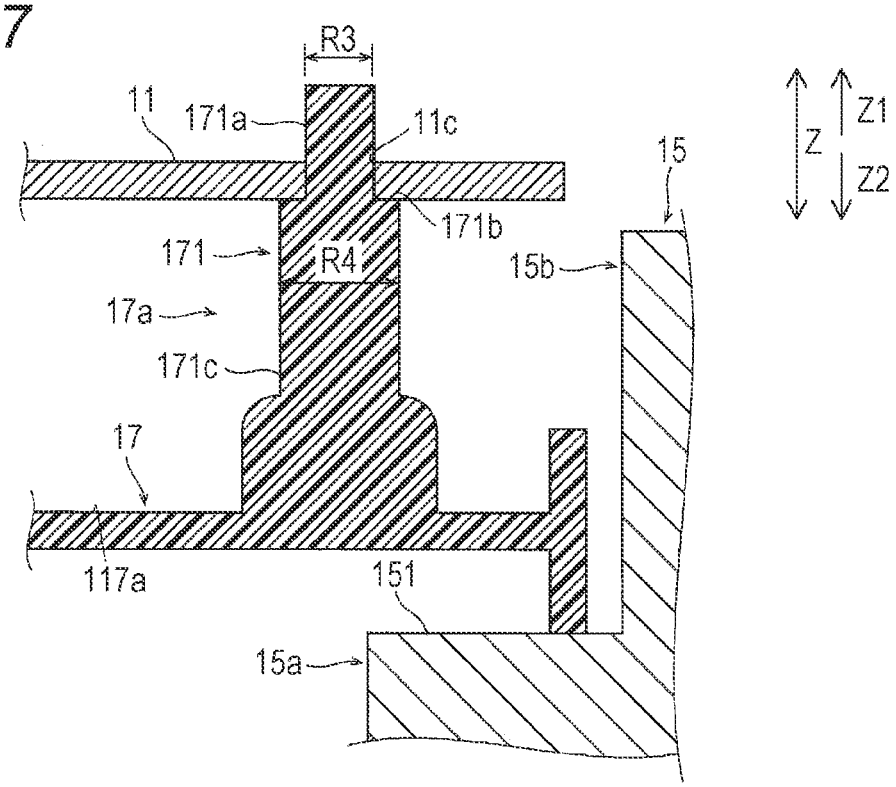
FIG. 7 is a cross-sectional view taken along a Z direction of a second positioning portion of a shift device according to the embodiment.

As illustrated in FIGS. 2 and 7, the second positioning portion 17a positions the control board 11 with respect to the inner lid 17. The second positioning portion 17a includes a second protrusion portion 171 protruding from the inner lid 17 toward the outer lid 16. The second protrusion portion 171 protrudes in the Z1 direction from a surface 117a of the inner lid 17 on the Z1 direction side. The second protrusion portion 171 has a substantially cylindrical shape.

The second protrusion portion 171 includes a small-diameter portion 171a, a second stepped portion 171b, and a large-diameter portion 171c.

The small-diameter portion 171a is provided on the outer lid 16 side and has a third diameter R3. That is, the small-diameter portion 171a is provided on a portion of the second protrusion portion 171 on the Z1 direction side. The third diameter R3 is a length in a direction orthogonal to the Z direction. The small-diameter portion 171a is inserted into the second board side insertion hole 11c of the control board 11. Accordingly, the second positioning portion 17a positions the control board 11 in a direction orthogonal to the Z direction.

The second stepped portion 171b is provided at a boundary portion between the small-diameter portion 171a and the large-diameter portion 171c. The second stepped portion 171b is a mounting surface extending in a direction orthogonal to the Z direction. The control board 11 in which the small-diameter portion 171a is inserted into the second board side insertion hole 11c is mounted on the second stepped portion 171b. That is, the control board 11 is mounted on the second stepped portion 171b in a state in which the second protrusion portion 171 is inserted into the second board side insertion hole 11c of the control board 11. Accordingly, the second positioning portion 17a positions the control board 11 in the Z direction.

The large-diameter portion 171c is provided on the housing 15 side with respect to the small-diameter portion 171a, and has a fourth diameter R4 larger than the third diameter R3. That is, the large-diameter portion 171c is provided on a portion of the second protrusion portion 171 on the Z2 direction side. The fourth diameter R4 is a length in a direction orthogonal to the Z direction. The large-diameter portion 171c is integrally provided on the inner lid 17.

As illustrated in FIG. 2, the plurality of boss portions 17b protrudes in the Z1 direction from the surface 117a of the inner lid 17 on the Z1 direction side. The plurality of boss portions 17b has a substantially truncated cone shape. The control board 11 is mounted on a surface of each of the plurality of boss portions 17b on the Z1 direction side. Accordingly, the plurality of boss portions 17b position the control board 11 in the Z direction. A fastening hole is formed on a surface of each of the plurality of boss portions 17b on the Z1 direction side. A female screw portion is provided in the fastening hole. A fastening member 102 is screwed into the fastening hole. Accordingly, the control board 11 is fixed to the inner lid 17.

The inner lid side insertion hole 17c is a through hole that penetrates the inner lid 17 in the Z direction. The inner lid side insertion hole 17c is formed in accordance with an arrangement position of the first positioning portion 152. The first protrusion portion 252 that positions the control board 11 is inserted into the inner lid side insertion hole 17c. Specifically, the large-diameter portion 252c of the first protrusion portion 252 is inserted into the inner lid side insertion hole 17c.

The positioning hole 17d is a through hole that penetrates the inner lid 17 in the Z direction. The positioning hole 17d is formed in accordance with an arrangement position of the connection terminal 12. The connection terminal 12 is inserted into the positioning hole 17d. Specifically, the connection terminal 12 is inserted into the positioning hole 17d, and the positioning hole 17d positions a tip of the connection terminal 12 on the control board 11 side. Accordingly, the tip of the connection terminal 12 is accurately inserted into the fitting hole 11d of the control board 11.

As illustrated in FIGS. 3 and 5, the inner lid side bearing hole 17e is a through hole that penetrates the inner lid 17 in the Z direction. The inner lid side bearing hole 17e is formed in accordance with an arrangement position of the output shaft 14. The output shaft 14 is rotatably inserted into the inner lid side bearing hole 17e. Here, as described above, the output shaft 14 is inserted into the housing side bearing hole 153. Accordingly, the output shaft 14 is inserted into the housing side bearing hole 153 and the inner lid side bearing hole 17e, whereby the inner lid 17 is positioned with respect to the housing 15.

As illustrated in FIG. 3, the inner lid 17 is housed in the housing space 18, and the motor 10 is attached to the inner lid 17.

Specifically, in the inner lid 17, at least the motor 10 is fixed to a surface 117a of the inner lid 17 on the Z1 direction side (surface on the outer lid 16 side). In the inner lid 17, the control board 11 is fixed to the surface 117a of the inner lid 17 on the Z1 direction side. In the inner lid 17, the shaft portion 13c and the shaft portion 13f of the driving force transmission mechanism 13 are fixed to a surface 117b of the inner lid 17 on the Z2 direction side (surface on the housing 15 side). Specifically, the inner lid 17 includes an attachment recessed portion 17f and an attachment recessed portion 17g. The attachment recessed portion 17f and the attachment recessed portion 17g are recessed in the Z1 direction with respect to the surface 117b of the inner lid 17 on the Z2 direction side. A portion of the shaft portion 13c on the Z1 direction side is rotatably inserted into the attachment recessed portion 17f. A portion of the shaft portion 13f on the Z1 direction side is rotatably inserted into the attachment recessed portion 17g.

(Shift Switching Mechanism)

As illustrated in FIG. 8, the shift switching mechanism 2 is connected to a manual spool valve (not shown) of a hydraulic valve body in a hydraulic control circuit portion (not shown) of the transmission mechanism portion (not shown) and a parking mechanism portion (not shown). The transmission mechanism portion is configured so that the shift state (P position, R position, N position, and D position) is mechanically switched by driving the shift switching mechanism 2.

The shift switching mechanism 2 includes the shift switching member 20 and a positioning member 21 including a pin 21a. The shift switching member 20 is a detent plate. The shift switching member 20 includes a plurality of (four) valley portions 20a provided so as to correspond to the shift positions (P position, R position, N position and D position). The positioning member 21 is configured to establish a shift position in a state in which the pin 21a is fitted in any of a plurality of the valley portions 20a of the shift switching member 20 that is revolved by driving of the actuator 1. The positioning member 21 is a detent spring. The positioning member 21 is configured to hold the detent plate in revolution angle positions corresponding to the shift positions (P position, R position, N position, and D position).

(Effect of Embodiment)

In the present embodiment, the following effects can be obtained.

In the present embodiment, as described above, the first positioning portion 152 that positions both the inner lid 17 and the control board 11 with respect to the housing 15 is provided to the housing 15. Accordingly, since the inner lid 17 to which the motor 10 is attached and the control board 11 provided with the rotation angle sensor 11a are positioned by the first positioning portion 152, the motor 10 and the rotation angle sensor 11a are positioned by the common first positioning portion 152. Therefore, unlike the case in which the motor 10 and the control board 11 are positioned respectively by the positioning portions separately provided, a positioning reference position can be made common by the first positioning portion 152. Therefore, accuracy of a relative positional relationship between the motor 10 and the rotation angle sensor 11a on the control board 11 can be improved. As a result, accuracy of the rotation angle position of the motor 10, which is detected by the rotation angle sensor 11a, can be easily improved. Therefore, accuracy with which the rotation angle position of the motor 10 is controlled by the control board 11 can be easily improved. Since the control board 11 is positioned with respect to the housing 15 by the first positioning portion 152, accuracy of the relative positional relationship between the rotation angle sensor 11f and the magnet portion 14a provided on the output shaft 14 can also be improve.

In the present embodiment, as described above, the first protrusion portion 252 protruding from the housing 15 toward the outer lid 16 side is provided in the first positioning portion 152. The inner lid side insertion hole 17c into which the first protrusion portion 252 is inserted is provided on the inner lid 17. Then, the first board side insertion hole 11b into which the first protrusion portion 252 is inserted is provided on the control board 11. The first protrusion portion 252 of the housing 15 is inserted into the inner lid side insertion hole 17c of the inner lid 17 and the first board side insertion hole 11b of the control board 11, whereby the inner lid 17 and the control board 11 are positioned with respect to the housing 15. Accordingly, since a structure for positioning the inner lid 17 and the control board 11 with respect to the housing 15 is realized by the first protrusion portion 252, the inner lid side insertion hole 17c, and the first board side insertion hole 11b, the structure for positioning the inner lid 17 and the control board 11 with respect to the housing 15 can be made relatively simple. As a result, complication of the structure of the shift device 100 can be suppressed.

In the present embodiment, as described above, the control board 11 is disposed on the outer lid 16 side with respect to the inner lid 17 in the housing space 18. The small-diameter portion 252a, which is provided on the outer lid 16 side and has the first diameter R1, is provided in the first protrusion portion 252. The large-diameter portion 252c, which is provided on the housing 15 side with respect to the small-diameter portion 252a and has the second diameter R2 larger than the first diameter R1, is provided in the first protrusion portion 252. The first stepped portion 252b, which is provided at the boundary portion between the small-diameter portion 252a and the large-diameter portion 252c and on which the control board 11 is mounted, is provided in the first protrusion portion 252. Accordingly, the control board 11 can be positioned by the small-diameter portion 252a in a direction orthogonal to the Z direction (direction in which the inner lid 17 and the outer lid 16 are arranged), and the control board 11 can be positioned in the Z direction (direction in which the inner lid 17 and the outer lid 16 are arranged) by mounting the control board 11 on the first stepped portion 252b at the boundary portion between the small-diameter portion 252a and the large-diameter portion 252c. As a result, since the control board 11 can be positioned both in the direction orthogonal to the Z direction and in the Z direction by the first protrusion portion 252, the structure for positioning the control board 11 with respect to the housing 15 can be prevented from being complicated.

In the present embodiment, as described above, in the inner lid 17, the second positioning portion 17a that positions the control board 11 with respect to the inner lid 17 is provided. Accordingly, the control board 11 is positioned by a plurality of positioning portions formed of the first positioning portion 152 and the second positioning portion 17a, whereby a circumferential rotation of the inner lid 17 around an axis along the Z direction (direction in which the inner lid 17 and the control board 11 are arranged) can be reliably suppressed. Therefore, accuracy of a relative positional relationship between the motor 10 and the rotation angle sensor 11a on the control board 11 can be improved.

In the present embodiment, as described above, the control board 11 is disposed on the outer lid 16 side with respect to the inner lid 17 in the housing space 18. The second protrusion portion 171 protruding from the inner lid 17 toward the outer lid 16 is provided in the second positioning portion 17a. The second board side insertion hole 11c into which the second protrusion portion 171 is inserted is provided on the control board 11. The second stepped portion 171b on which the control board 11 is mounted is provided to the second protrusion portion 171 in a state in which the second protrusion portion 171 is inserted into the second board side insertion hole 11c of the control board 11. Accordingly, the control board 11 can be positioned in the Z direction (direction in which the inner lid 17 and the outer lid 16 are arranged) only by providing the second stepped portion 171b to the second protrusion portion 171. As a result, the control board can be positioned with respect to the housing 15 while preventing the structure of the second protrusion portion 171 from becoming complicated.

In the present embodiment, as described above, the gear 13a, gear 13b, gear 13d, and gear 13e which are rotated by the driving force from the motor 10, and the shaft portion 13c and shaft portion 13f which are attached to the inner lid 17 and rotatably supports the gear 13a, gear 13b, gear 13d, and gear 13e are provided to the driving force transmission mechanism 13. The first positioning portion 152 positions the inner lid 17 with respect to the housing 15, whereby the driving force transmission mechanism 13 attached to the inner lid 17 via the shaft portion 13c and the shaft portion 13f is also positioned with respect to the housing 15. Accordingly, the first positioning portion 152 not only can position the motor 10 and the control board 11 with respect to the housing 15, but also can position the driving force transmission mechanism with respect to the housing 15. As a result, unlike the case in which the motor 10 and the control board 11 are positioned with respect to the housing 15 and the driving force transmission mechanism 13 is positioned with respect to the housing 15 by a separate member, an increase in the number of components of the shift device 100 and the complication of the structure can be suppressed.

In the present embodiment, as described above, the housing side bearing hole 153 into which the output shaft 14 is rotatably inserted is provided on the housing 15. The inner lid side bearing hole 17e into which the output shaft 14 is rotatably inserted is provided on the inner lid 17. The output shaft 14 is inserted into the housing side bearing hole 153 and the inner lid side bearing hole 17e, whereby the inner lid 17 is positioned with respect to the housing 15. The first positioning portion 152 is disposed on the opposite side of the output shaft 14 with respect to a center position Hc of the housing 15 when seen from an axial direction side of the output shaft 14. Accordingly, the first positioning portion 152 and the output shaft 14 prevent the inner lid 17 from moving in a direction orthogonal to the Z direction (direction in which the output shaft 14 extends), and prevent the inner lid 17 from rotating around the axis of the output shaft 14. As a result, unlike the case in which the movement of the inner lid 17 and the rotation of the inner lid 17 are prevented by using a member provided separately from the output shaft 14, the structure for positioning the inner lid 17 with respect to the housing 15 can be prevented from being complicated. Since the movement of the inner lid 17 in the direction orthogonal to the Z direction (direction in which the output shaft 14 extends) and the rotation of the inner lid 17 around the axis of the output shaft 14 can be prevented, accuracy of positioning the driving force transmission mechanism 13 and the motor 10 can be improved.

MODIFICATION EXAMPLES

The embodiments disclosed herein should be considered to be examples in all aspects and not to be limited. The scope of the present disclosure is not a description of the embodiment described above but is indicated by the scope of claims, and further includes meanings equivalent to the scope of claims and all modifications (modification examples) within the scope of claims.

Figure 9:
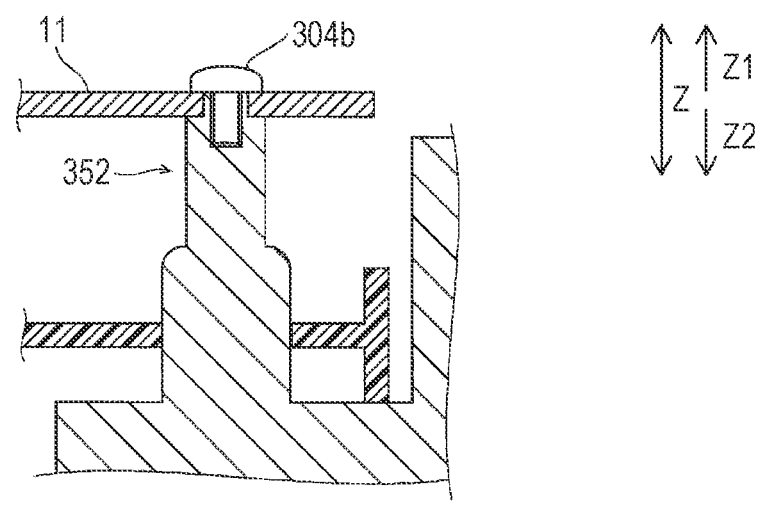
FIG. 9 is a cross-sectional view taken along a Z direction of a first positioning portion of a shift device according to a modification example of the embodiment.

For example, in the above embodiment, it is described that in the first protrusion portion 252, the control board 11 is mounted on the first stepped portion 252b, but the present disclosure is not limited to this. In the present disclosure, as in the modification example illustrated in FIG. 9, the first protrusion portion 352 may be configured so that the control board 11 can be fixed to a fastening member 304.

In the above embodiment, it is described that the first protrusion portion 252 includes the first stepped portion 252b, but the present disclosure is not limited to this. In the present disclosure, the first protrusion portion may not include the first stepped portion.

In the above embodiment, it is described that the inner lid 17 includes the second positioning portion 17a that positions the control board 11 with respect to the inner lid 17, but the present disclosure is not limited to this. In the present disclosure, the inner lid may not include the second positioning portion.

In the above embodiment, it is described that the second protrusion portion 171 includes the second stepped portion 171b, but the present disclosure is not limited to this. In the present disclosure, the second protrusion portion may not include the second stepped portion.

In the above embodiment, it is described that the first positioning portion 152 positions the inner lid 17 with respect to the housing 15, whereby the driving force transmission mechanism 13 is also positioned with respect to the housing 15, but the present disclosure is not limited to this. In the present disclosure, the first positioning portion may position only the inner lid with respect to the housing, and may not position the driving force transmission mechanism.

A shift device according to an aspect of the present disclosure, includes: a shift switching member that includes a plurality of valley portions corresponding to a shift position; and an actuator that drives the shift switching member, in which the actuator includes a motor, a driving force transmission mechanism that transmits a driving force of the motor to an output shaft, a control board that includes a rotation angle sensor detecting a rotation angle of the motor and controls the motor based on a detection result obtained by the rotation angle sensor, a housing and an outer lid that form a housing space housing the motor and the control board, the outer lid covering an opening of the housing, and an inner lid that is housed in the housing space and to which the motor is attached, and the housing includes a first positioning portion that positions both the inner lid and the control board with respect to the housing.

In the shift device according to the aspect of the present embodiment, as described above, the first positioning portion that positions both the inner lid and the control board with respect to the housing is provided to the housing. Accordingly, since the inner lid to which the motor is attached and the control board provided with the rotation angle sensor are positioned by the first positioning portion, the motor and the rotation angle sensor are positioned by the common first positioning portion. Therefore, unlike the case in which the motor and the control board are positioned respectively by the positioning portions separately provided, a positioning reference position can be made common by the common first positioning portion. Therefore, accuracy of a relative positional relationship between the motor and the rotation angle sensor on the control board can be improved. As a result, accuracy of the rotation angle position of the motor, which is detected by the rotation angle sensor, can be easily improved. Therefore, accuracy with which the rotation angle position of the motor is controlled by the control board can be easily improved.

In the shift device according to the aspect of the present disclosure, it is preferable that the first positioning portion includes a first protrusion portion protruding from the housing toward the outer lid side, the inner lid includes an inner lid side insertion hole into which the first protrusion portion is inserted, and the control board includes a first board side insertion hole into which the first protrusion portion is inserted, and the first protrusion portion of the housing is inserted into the inner lid side insertion hole of the inner lid and the first board side insertion hole of the control board, whereby the inner lid and the control board is positioned with respect to the housing.

In this configuration, since a structure for positioning the inner lid and the control board with respect to the housing is realized by the first protrusion portion, the inner lid side insertion hole, and the first board side insertion hole, the structure for positioning the inner lid and the control board with respect to the housing can be made relatively simple. As a result, complication of the structure of the shift device can be suppressed.

In this case, it is preferable that the control board is disposed on the outer lid side with respect to the inner lid in the housing space, and the first protrusion portion includes a small-diameter portion that is provided on the outer lid side and has a first diameter, a large-diameter portion that is provided on the housing side with respect to the small-diameter portion and has a second diameter larger than the first diameter, and a first stepped portion that is provided at a boundary portion between the small-diameter portion and the large-diameter portion and on which the control board is mounted.

In this configuration, the control board can be positioned by the small-diameter portion in a direction orthogonal to the direction in which the inner lid and the outer lid are arranged, and the control board can be positioned in the direction in which the inner lid and the outer lid are arranged by mounting the control board on the first stepped portion provided at the boundary portion between the small-diameter portion and the large-diameter portion. As a result, since the control board can be positioned both in a direction orthogonal to the direction in which the inner lid and the outer lid are arranged and in the direction in which the inner lid and the outer lid are arranged by the first protrusion portion, the structure for positioning the control board with respect to the housing can be prevented from being complicated.

In the shift device according to the aspect of the present disclosure, it is preferable that the inner lid includes a second positioning portion that positions the control board with respect to the inner lid.

In this configuration, the control board is positioned by a plurality of positioning portions formed of the first positioning portion and the second positioning portion, whereby a circumferential rotation of the inner lid around an axis along the direction in which the inner lid and the control board are arranged can be reliably suppressed. Therefore, accuracy of a relative positional relationship between the motor and the rotation angle sensor on the control board can be improved.

In this case, it is preferable that the control board is disposed on the outer lid side with respect to the inner lid in the housing space, the second positioning portion includes a second protrusion portion protruding from the inner lid toward the outer lid side, the control board includes a second board side insertion hole into which the second protrusion portion is inserted, and the second protrusion portion includes a second stepped portion on which the control board is mounted in a state in which the second protrusion portion is inserted into the second board side insertion hole of the control board.

In this configuration, since the control board can be positioned in the direction in which the inner lid and the outer lid are arranged only by providing the second stepped portion to the second protrusion portion, the control board can be positioned with respect to the housing while preventing the structure of the second protrusion portion from becoming complicated.

In the shift device according to the aspect of the present disclosure, it is preferable that the driving force transmission mechanism includes a gear that is rotated by the driving force from the motor, and a shaft portion that is attached to the inner lid and rotatably supports the gear, and the first positioning portion positions the driving force transmission mechanism attached to the inner lid via the shaft portion with respect to the housing by positioning the inner lid with respect to the housing.

In this configuration, the first positioning portion not only can position the motor and the control board with respect to the housing, but also can position the driving force transmission mechanism with respect to the housing. As a result, unlike a case in which the motor and the control board are positioned with respect to the housing and the driving force transmission mechanism is positioned with respect to the housing by a separate member, an increase in the number of components of the shift device and the complication of the structure can be suppressed.

In the shift device according to the aspect of the present disclosure, it is preferable that the housing includes a housing side bearing hole into which the output shaft is rotatably inserted, the inner lid includes an inner lid side bearing hole into which the output shaft is rotatably inserted, the output shaft is inserted into the housing side bearing hole and the inner lid side bearing hole, whereby the inner lid is positioned with respect to the housing, and the first positioning portion is disposed on an opposite side of the output shaft with respect to a center position of the housing when seen in an axial direction of the output shaft.

In this configuration, the first positioning portion and the output shaft prevent the inner lid from moving in a direction orthogonal to the direction in which the output shaft extends, and prevent the inner lid from rotating around the axis of the output shaft. As a result, unlike the case in which the movement of the inner lid and the rotation of the inner lid are prevented by using a member provided separately from the output shaft, the structure for positioning the inner lid with respect to the housing can be prevented from being complicated. Since the movement of the inner lid in a direction orthogonal to the direction in which the output shaft extends and the rotation of the inner lid around the axis of the output shaft can be prevented, accuracy of positioning the driving force transmission mechanism and the motor can be improved.

In the shift device according to the aspect of the present disclosure, the following configuration is also considered.

Appendix 1

That is, in the shift device including the first protrusion portion, a female screw portion for fastening the first protrusion portion and the control board by a fastening member is formed in an end of the first protrusion portion on the control board side.

In this configuration, since the control board not only can be positioned by the first protrusion portion, but also can be fixed by the female screw portion, an increase in the number of the components of the shift device and the complication of the structure can be suppressed as compared with the case in which the control board is positioned and fixed by a separate member.

Appendix 2

According to the aspect of the present disclosure, the shift device further includes a first connection terminal that connects an outer device and the control board via the inner lid and of which an end on the control board side is attached to the control board, in which the motor includes a second connection terminal that connects the motor and the control board and of which an end on the control board side is attached to the control board, and the first positioning portion positions the control board with respect to an end of the first connection terminal on the control board side and an end of the second connection terminal on the control board side by positioning both the inner lid and the control board with respect to the housing.

In this configuration, the first positioning portion positions the control board with respect to the end of the first connection terminal on the control board side and the end of the second connection terminal on the control board side, whereby an increase in the number of the components of the shift device and the complication of the structure can be suppressed unlike the case in which a separate member positions the control board instead of the first connection terminal and the second connection terminal positioning the control board.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A shift device comprising:
a shift switching member that includes a plurality of valley portions corresponding to a shift position; and
an actuator that drives the shift switching member,
wherein the actuator includes
a motor,
a driving force transmission mechanism that transmits a driving force of the motor to an output shaft,
a control board that includes a rotation angle sensor detecting a rotation angle of the motor and controls the motor based on a detection result obtained by the rotation angle sensor,
a housing and an outer lid that form a housing space housing the motor and the control board, the outer lid covering an opening of the housing, and
an inner lid that is housed in the housing space and to which the motor is attached, and
the housing includes a first positioning portion that positions both the inner lid and the control board with respect to the housing.

2. The shift device according to claim 1, wherein
the first positioning portion includes a first protrusion portion protruding from the housing toward the outer lid side,
the inner lid includes an inner lid side insertion hole into which the first protrusion portion is inserted, and the control board includes a first board side insertion hole into which the first protrusion portion is inserted, and
the first protrusion portion of the housing is inserted into the inner lid side insertion hole of the inner lid and the first board side insertion hole of the control board, whereby the inner lid and the control board is positioned with respect to the housing.

3. The shift device according to claim 2, wherein
the control board is disposed on the outer lid side with respect to the inner lid in the housing space, and
the first protrusion portion includes
a small-diameter portion that is provided on the outer lid side and has a first diameter,
a large-diameter portion that is provided on the housing side with respect to the small-diameter portion and has a second diameter larger than the first diameter, and
a first stepped portion that is provided at a boundary portion between the small-diameter portion and the large-diameter portion and on which the control board is mounted.

4. The shift device according to claim 1, wherein the inner lid includes a second positioning portion that positions the control board with respect to the inner lid.

5. The shift device according to claim 4, wherein
the control board is disposed on the outer lid side with respect to the inner lid in the housing space,
the second positioning portion includes a second protrusion portion protruding from the inner lid toward the outer lid side,
the control board includes a second board side insertion hole into which the second protrusion portion is inserted, and
the second protrusion portion includes a second stepped portion on which the control board is mounted in a state in which the second protrusion portion is inserted into the second board side insertion hole of the control board.

6. The shift device according to claim 1, wherein the driving force transmission mechanism includes
a gear that is rotated by a driving force from the motor, and
a shaft portion that is attached to the inner lid and rotatably supports the gear, and
the first positioning portion positions the driving force transmission mechanism attached to the inner lid via the shaft portion with respect to the housing by positioning the inner lid with respect to the housing.

7. The shift device according to claim 1, wherein
the housing includes a housing side bearing hole into which the output shaft is rotatably inserted,
the inner lid includes an inner lid side bearing hole into which the output shaft is rotatably inserted,
the output shaft is inserted into the housing side bearing hole and the inner lid side bearing hole, whereby the inner lid is positioned with respect to the housing, and
the first positioning portion is disposed on an opposite side of the output shaft with respect to a center position of the housing when seen in an axial direction of the output shaft.

* * * * *